United States Patent [19]

Hoover

[11] 4,227,841
[45] Oct. 14, 1980

[54] BORING BAR

[76] Inventor: Donald L. Hoover, 4428 Coachwood La., Gastonia, N.C. 28052

[21] Appl. No.: 12,304

[22] Filed: Feb. 15, 1979

[51] Int. Cl.³ ............................................. B23B 51/00
[52] U.S. Cl. ...................................... 408/197; 408/713
[58] Field of Search ............... 408/144, 186, 197, 226, 408/713; 407/77, 107

[56] References Cited

U.S. PATENT DOCUMENTS

| 79,974 | 7/1868 | Haskell | 408/226 |
|---|---|---|---|
| 502,564 | 8/1893 | Hunter | 407/107 X |
| 605,422 | 6/1898 | Hardy | 408/226 X |
| 3,375,741 | 4/1968 | Guglielmetti | 408/713 X |

Primary Examiner—Z. R. Bilinsky
Attorney, Agent, or Firm—Bell, Seltzer, Park & Gibson

[57] ABSTRACT

A boring bar whose body has an inclined end surface on one free end thereof against which an elongate cutting member is positioned. The inclined end surface has a recess extending inwardly therefrom in which a yoke member is positioned, the yoke member having a portion extending outwardly beyond the inclined end surface and perpendicular thereto and surroundingly engaging the cutting member, and a screw or other suitable securing element cooperates with the yoke member for applying an inward force thereto in a direction perpendicular to the inclined end surface for clampingly securing the cutting member firmly against the inclined end surface of the body.

11 Claims, 8 Drawing Figures

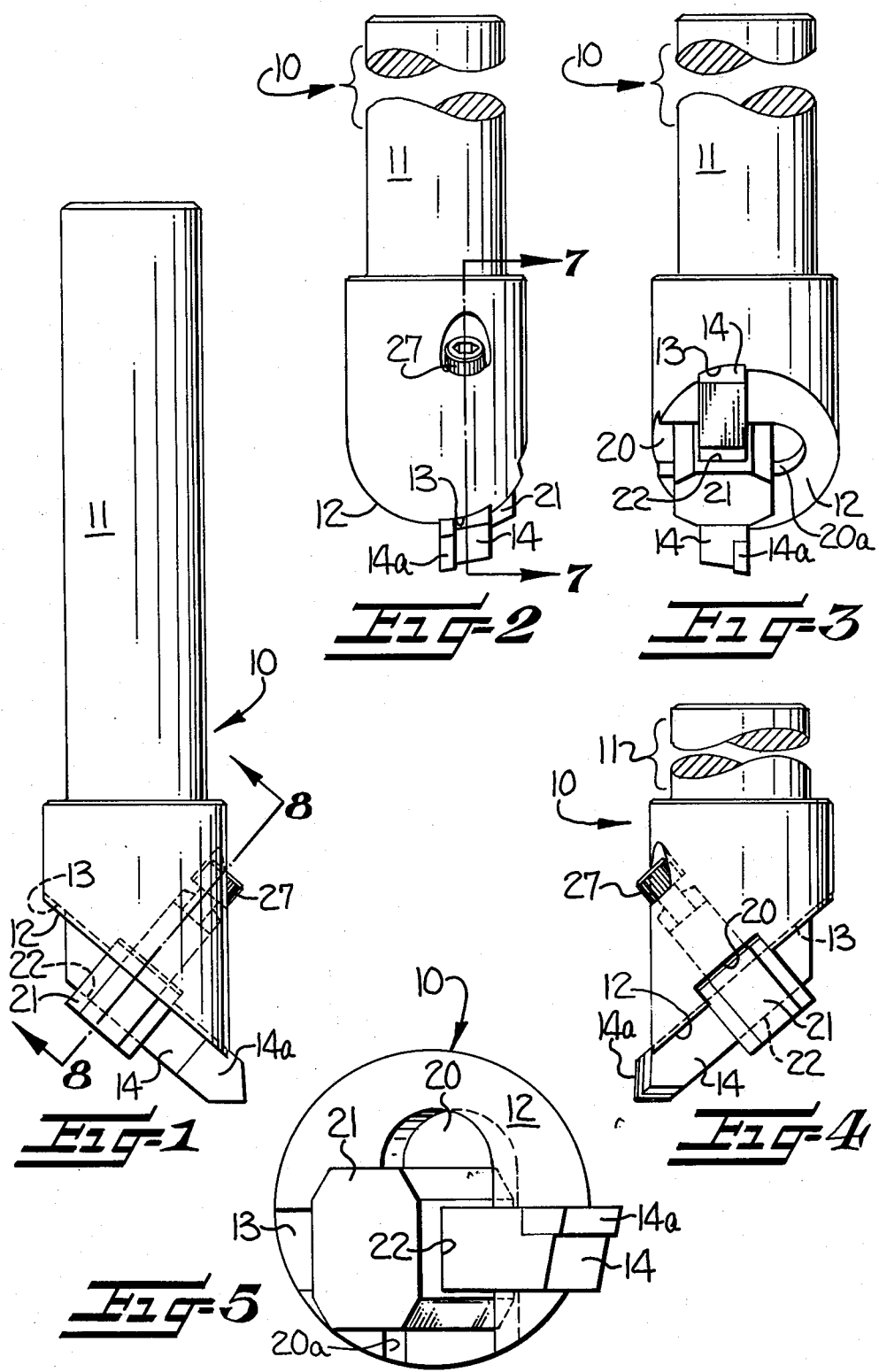

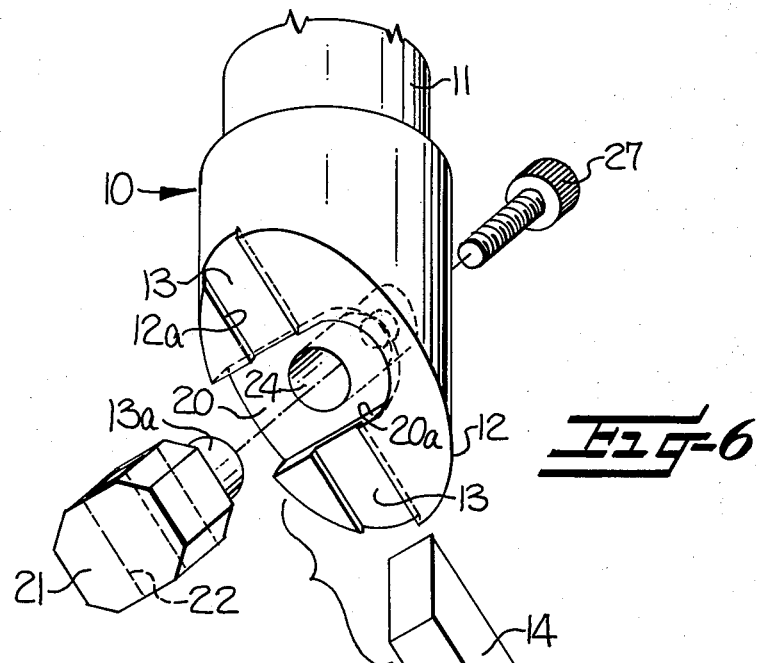
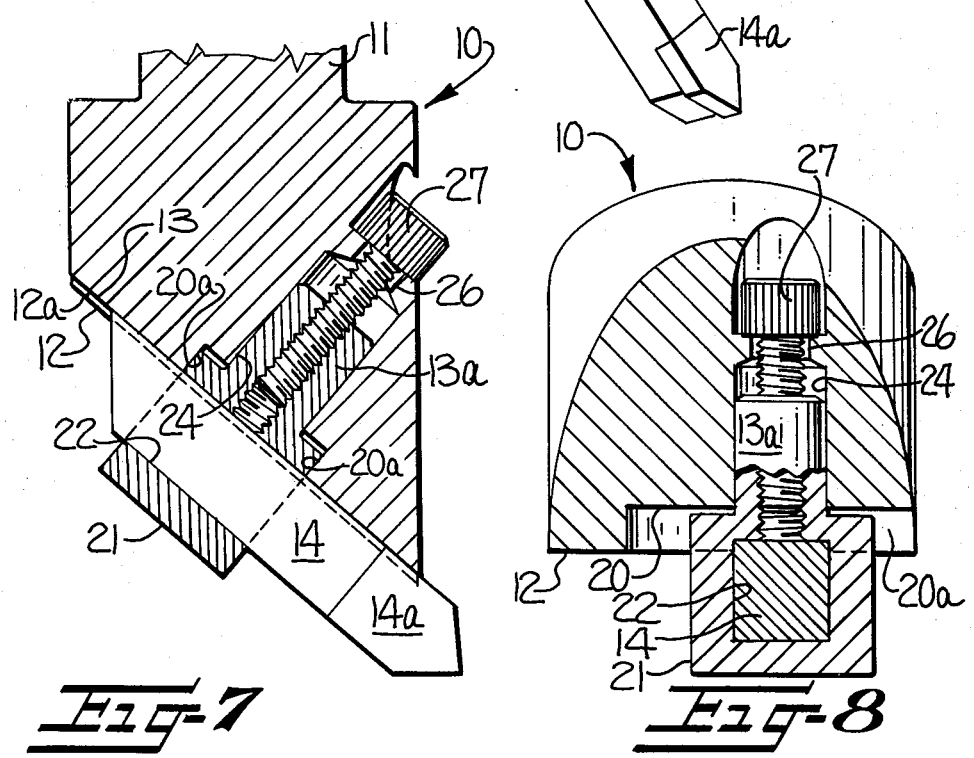

BORING BAR

FIELD OF INVENTION

This invention relates to an improved boring bar for internal machining on boring mills and the like.

BACKGROUND OF THE INVENTION

Many different types of boring bars have been proposed heretofore. However, the types of boring bars now available to my knowledge have one or more deficiencies, such as:

(a) The body of the boring bar is slotted longitudinally at one end for accommodating the cutting member or tool, and the boring bar is thus considerably weakened to the extent that the depth of cut which can be made in a metal workpiece is unduly limited.

(b) The cutting member is so mounted in the boring bar body that the squeezing or clamping together of opposing portions of the boring bar body is relied upon for securing the cutting member or tool therebetween.

(c) The manner in which the cutting member is mounted in the boring bar body has required that substantial amounts of stock be cut away from the boring bar body in order to accommodate securement of the cutting member thereto, thus further unduly weakening the body.

BRIEF SUMMARY OF THE INVENTION

With the foregoing in mind, it is an object of this invention to provide an improved boring bar construction which substantially reduces the above and other problems present in the construction of known prior art boring bars.

The above and other objects are achieved in accordance with this invention by providing a boring bar including an elongate body having a free end provided with an end surface extending transversely of the axis of the body, and wherein an elongate cutting member or tool is positioned against the body end surface. The body end surface has a recess extending inwardly therefrom in which a yoke member is positioned and which has a portion extending outwardly beyond the body end surface and surroundingly engaging the elongate cutting member. Securing means cooperates with the yoke member for applying an inward force thereto for clampingly securing the cutting member firmly against the body end surface.

BRIEF DESCRIPTION OF THE DRAWINGS

Some of the objects and advantages of the invention having been stated, others will appear as the description proceeds when taken in connection with the accompanying drawings, in which FIG. 1 is a side elevation of a preferred embodiment of the improved boring bar shown occupying a substantially upright or vertical position, as would generally be the case when the boring bar is mounted in a vertical mill machine;

FIG. 2 is a front elevation of the improved boring bar looking at the right-hand side of FIG. 1 with a portion of the boring bar body broken away;

FIG. 3 is a rear elevation of the improved boring bar looking at the left-hand side of FIG. 1;

FIG. 4 is a side elevation of the boring bar looking at the opposite side thereof from that shown in FIG. 1;

FIG. 5 is an enlarged view of the free end of the boring bar body and the elongate cutting member secured thereto;

FIG. 6 is a perspective view of a free end portion of the boring bar body showing the yoke member and the cutting member in exploded relation thereto;

FIG. 7 is an enlarged fragmentary sectional view taken substantially along line 7—7 in FIG. 2; and FIG. 8 is an enlarged fragmentary sectional view taken substantially along line 8—8 in FIG. 1.

DETAILED DESCRIPTION

Referring more specifically to the drawings, in the preferred embodiment of the invention the boring bar comprises an elongate body 10 whose shank or upper portion 11 is adapted to be inserted in the rotatable spindle of a boring mill or other machine or device adapted for boring operations. The body 10 has a free end 12 provided with an end surface 13 thereon extending transversely of the longitudinal axis of the body. Preferably, the end surface 13 is inclined at other than a right angle, namely an acute angle, relative to the longitudinal axis of the body 10. By way of example, the body end surface may be inclined at an acute angle of about 30 to 50 degrees relative to the longitudinal axis of body 10.

The end surface 13 of the boring bar provides a stabilizing support for a substantial or major portion of the length of an elongate cutting member or tool 14 positioned against the end surface 13. Desirably, but not necessarily, the free end 12 of the boring bar body 10 may be provided with a shallow groove 12a extending transversely of the body free end 12 from one side to the other thereof with the bottom of the groove 12a then defining the free end surface 13 against which the cutting member 14 is positioned. The elongate cutting member 14 extends outwardly beyond one side of the body free end 12 and has a cutting tip, point or edge 14a on its free outer end for cutting into a metal workpiece during use. Preferably, the cutting member 14 is substantially square or rectangular in cross-section thus providing a substantially flat surface thereon for bearing against the body end surface 13 when the cutting member is secured to the body in a manner to be later described.

As best shown in FIGS. 5-7, the free end 12 of body 10 has a relatively shallow recess 20 therein extending across and inwardly from the body end surface 13 and in which a yoke member 21 is positioned. A portion of yoke member 21 extends outwardly beyond the body end surface 13 and surroundingly engages the cutting member 14. Securing means, to be later described, cooperates with yoke member 21 for applying an inward force thereto for clampingly securing the cutting member 14 firmly against the body end surface 13. As shown, the outwardly extending portion of the yoke member 21 has a substantially rectangular or square opening 22 extending transversely therethrough and through which a medial portion of the cutting member 14 extends, it being preferred that the opening 22 and the cutting member 14 are of substantially the same size and configuration so that the cutting member 14 slidably penetrates the opening 22 to permit longitudinal adjustment of the cutting member 14 relative to the yoke member 21 while being restrained from rotation about the axis of the boring bar body 10 relative to the yoke member 21.

Although the yoke member 21 is shown completely surrounding a medial portion of the cutting member 14 in FIGS. 5 and 8, it is apparent that one or the other of the side wall portions of the yoke member 21 may be slotted or opened without interfering with the intended function of the yoke member 21.

To aid in restraining the cutting member 14 from turning relative to the body 10 under torsional stresses during use of the boring bar, at least that portion of the main body of yoke member 21 positioned in the recess 20 is of such cross-sectional configuration and size relative to the recess 20 that side portions defining the recess 20 restrain the yoke member 21 from turning therein. Accordingly, it will be observed in FIGS. 4 and 7 that the body free end 12 is provided with opposite wall surfaces 20a which define the recess 20 in the body end surface 13, and the yoke member 21 is polygonal in cross-section within the recess 20 and fits between the opposite wall surfaces 20a of the recess 20 for aiding in preventing turning of the yoke member 21 and the cutting member 14 relative to the body under torsional stresses during use of the boring bar.

As indicated earlier herein, securing means cooperates with yoke member 21 for applying an inward force thereto for clampingly securing the cutting member 14 firmly against the body end surface 13. According to the present embodiment of the invention, such securing means is accommodated by a small passage or bore 24 extending inwardly from the bottom of the recess 20. The passage 24 communicates with and is of lesser diameter than the width of the recess 20 and extends substantially perpendicular to the inclined end surface 13 of the body 10. The main or body portion of the yoke member 21 has a shank or inner portion 13a extending inwardly therefrom perpendicular to the inclined end surface 13 into passage 24, it thus being apparent that the shank 13a of the yoke member 21 is of reduced cross-sectional area or diameter relative to the cross-sectional area of the main portion of the yoke member 21.

In order to apply the desired inward force to the yoke member 21 so as to clampingly secure the cutting member 14 against the body end surface 13, the passage or bore 24 is provided with a restriction 26 therein (FIGS. 7 and 8) loosely penetrated by the body of a threaded fastening means or screw 27 whose head bears against the restriction 26 and whose threaded body threadedly engages the shank portion 13a of the yoke member 21. As best illustrated in FIGS. 7 and 8, the distance between the inner surface of the outer wall portion of yoke member 21 and the inner surface of the main portion of the yoke member 21 is less than the distance between the outer surface of the cutting member 14 and the bottom of recess 20 so that the main portion of yoke member 21 will not seat against the bottom of recess 20 when the yoke member 20 is secured in the recess 20 by the screw 27. Thus, it is apparent that by tightening the screw 27 through the wall portion of the body 10 remote from the body end surface 13, the screw applies an inward force to the shank or inner portion 13a of yoke member 21, and such inward force is effective to cause the outer portion of the yoke member 21 to clampingly secure the cutting member 14 firmly against the inclined end surface 13 of the body 10.

As indicated earlier herein, the body free end surface 13 (against which the elongate cutting member 14 is positioned) may be defined as the bottom of the shallow groove 12a. Such groove 12a may be desirable to serve as a further aid in restraining the cutting member 14 from turning relative to and about the axis of the body 10 under torsional stresses present during use of the boring bar. To this end, the spacing between opposing sidewall portions of the groove 12a preferably is about the same as or slightly greater than the width of cutting member 14 such that opposing sidewall portions of the cutting member 14 may slidably engage the corresponding sidewall portions of groove 12a. Thus, it can be appreciated that the opposing side portions of groove 12a may serve to aid in restraining the cutting member 14 from turning relative to body 10 under torsional stresses during use of the boring bar.

As preferred, the groove 12a is offset somewhat with respect to the axis of the boring bar body 10 such that one sidewall portion of the groove 12a and the corresponding leading side surface of the cutting member 14 and its tip 14a extend substantially along a radius line extending from the center or longitudinal axis of the boring bar 10. Thus, it follows that the cutting member tip 14a will be positioned at the desired location for most effective cutting therewith in its arc or path of travel as it is removing material from a metal workpiece. This is also a desirable location of the cutting member 14 to aid a person in determining an extent of radial adjustment of the cutting member relative to body 10 for obtaining the desired diameter of the internal cut to be made in a workpiece during subsequent use of the boring bar.

From the foregoing description, it can be seen that the boring bar of this invention is so constructed as to have a substantial area of the free end of the body 10 as a back-up surface serving to bear a large or major part of the torsional stresses present when the cutting tip 14a is biting into the metal of the workpiece being machined. Tests of a boring bar constructed in accordance with this invention have shown that the boring bar is capable of cutting a substantially greater depth of metal from a workpiece during each cut than other known types of boring bars of comparable size without producing undesirable vibration or "chatter" of the boring bar and without fracturing the same under torsional stresses present during use of the boring bar.

In the drawings and specification there has been set forth a preferred embodiment of the invention and although specific terms are employed they are used in a generic and descriptive sense only and not for purposes of limitation.

I claim:

1. A boring bar comprising an elongate body having a free end provided with an end surface thereon inclined at an acute angle transversely of the longitudinal axis of said body, an elongate cutting member positioned against said inclined end surface, said inclined end surface having a recess extending inwardly therefrom, a yoke member positioned in said recess and having a portion extending outwardly beyond said inclined end surface and perpendicular thereto and surroundingly engaging said cutting member, said yoke member also having an inner portion extending inwardly beyond said recess and perpendicular to said inclined end surface, and securing means cooperating with said inner portion of said yoke member for applying an inward force thereto in a direction perpendicular to said inclined end surface of said body for clampingly securing said cutting member firmly against said inclined end surface.

2. A boring bar according to claim 1 wherein at least a portion of said yoke member positioned in said recess is of such cross-sectional configuration and size relative to said recess that portions of said body defining said recess restrain said yoke member from turning therein to thereby aid in restraining said cutting member from turning relative to said body under torsional stresses during use of the boring bar.

3. A boring bar according to claim 1 wherein said body free end is provided with an elongate groove therein intersecting said recess and whose bottom defines said inclined end surface against which said cutting member is clampingly secured, and wherein said groove has opposite side portions thereof engaging opposite sides of said cutting member for aiding in restraining said cutting member from turning relative to said body under torsional stresses during use of the boring bar.

4. A boring bar according to claim 3 wherein at least a portion of said yoke member positioned in said recess is of such cross-sectional configuration and size relative to said recess that portions of said body defining said recess restrain said yoke member from turning therein to thereby further aid in restraining said cutting member from turning relative to said body under torsional stresses during use of the boring bar.

5. A boring bar according to claim 1 wherein said inclined end surface of said body is provided with opposite side wall surfaces defining said recess therein, and wherein said yoke member positioned in said recess is provided with opposite surfaces thereon fitting between and in engagement with said opposite side wall surfaces of said recess to aid in preventing relative turning movement between said yoke member and said body under torsional stresses during use of the boring bar.

6. A boring bar according to claim 1 wherein said securing means comprises threaded means fitting in said body and threadedly engaging said inner portion of said yoke member, and wherein the axis of said threaded means also extends substantially perpendicular to said inclined end surface of said body.

7. A boring bar comprising an elongate body having a free end provided with an end surface thereon inclined at an acute angle transversely of the longitudinal axis of said body, an elongate cutting member positioned against said inclined end surface, said inclined end surface having a recess therein and a passage communicating with said recess and extending inwardly therefrom substantially perpendicular to said inclined end surface, a yoke member positioned in said recess and having a portion extending outwardly beyond said inclined end surface and perpendicular thereto and engaging at least the outer surface of said elongate cutting member, said yoke member also having a shank portion thereon extending perpendicular to said inclined end surface and inwardly into said passage, and securing means cooperating with said shank portion for applying an inward force thereon in a direction perpendicular to said inclined end surface of said body for clampingly securing said cutting member firmly against said inclined end surface of said body.

8. A boring bar according to claim 7 wherein said yoke member positioned in said recess is of such cross-sectional configuration and size relative to said recess that portions of said body defining said recess restrain said yoke member from turning therein to thereby aid in preventing relative turning movement between said cutting member and said body under torsional stresses during use of the boring bar.

9. A boring bar according to claim 7 wherein said yoke member is polygonal in cross-section within said recess and fits between portions of said body defining said recess for aiding in preventing turning of said yoke member and said cutting member relative to said body under torsional stresses during use of the boring bar.

10. A boring bar comprising an elongate body having a free end with an acutely inclined end surface extending transversely of the longitudinal axis of said body, an elongate cutting member positioned against said inclined end surface, said inclined end surface having a recess therein and a passage communicating with and being of lesser cross-sectional area than said recess and extending substantially perpendicular to said inclined end surface, a yoke member having a main portion of out of round cross-sectional configuration and engaging opposite portions of said body defining said recess, said main portion of said yoke member surroundingly engaging said cutting member, said yoke member also having a shank portion extending perpendicular to said inclined end surface and inwardly from said main portion into said passage, and threaded fastening means positioned in that end of said passage remote from said yoke member main portion and threadedly engaging said shank portion for applying an inward force to said yoke member in a direction perpendicular to said inclined end surface for clampingly securing said cutting member firmly against said inclined end surface of said body.

11. A boring bar according to claim 10 wherein said body free end is provided with a relatively shallow elongate groove therein whose bottom defines said inclined end surface of said body with said groove extending generally diametrically from side to side of said body free end, and wherein the width of said groove is such as to slidably receive said elongate member therein for aiding in restraining said cutting member from turning relative to said body under torsional stresses during use of the boring bar.

* * * * *